United States Patent [19]

Schoepe et al.

[11] Patent Number: 5,025,826
[45] Date of Patent: Jun. 25, 1991

[54] FAUCET HANDLE UNIVERSAL COUPLING

[76] Inventors: Adolf Schoepe, 1800 Via Burton, Anaheim, Calif. 92806; Oscar Dufau, 2400 Wildwood Ct., Fullerton, Calif. 92635

[21] Appl. No.: 578,893

[22] Filed: Sep. 4, 1990

[51] Int. Cl.⁵ .................. F16K 31/60; F16K 43/00
[52] U.S. Cl. .................. 137/315; 16/114 R; 16/121; 16/DIG. 30; 74/548; 74/553; 251/291; 403/3; 403/370
[58] Field of Search .............. 74/548, 553; 16/110 R, 16/114 R, 121, DIG. 24, DIG. 30; 137/315, 359, 360; 403/3, 361, 369, 370; 251/291, 292

[56] References Cited

U.S. PATENT DOCUMENTS

| | | | |
|---|---|---|---|
| 7,719 | 6/1877 | Badcock | 403/361 |
| 524,848 | 8/1894 | Doebler | 403/370 |
| 602,149 | 4/1898 | White | 403/370 |
| 612,489 | 10/1898 | Dean | 403/370 |
| 1,491,342 | 4/1924 | Eckhardt | 403/370 |
| 1,739,740 | 12/1929 | Stoeltzlen | 403/370 |
| 1,989,083 | 1/1935 | Dahnken | 403/361 |
| 2,191,304 | 2/1940 | Ashendorf | 74/553 |
| 2,389,610 | 11/1945 | Christenson | 403/361 |
| 2,516,472 | 7/1950 | MacKeage, Jr. | 403/361 |
| 3,357,066 | 12/1967 | Moritz | 403/361 |
| 3,466,009 | 9/1969 | Giles | 403/369 |
| 3,768,845 | 10/1973 | Gilliland | 16/121 |
| 4,465,350 | 1/1986 | Rozek | 251/292 |
| 4,593,430 | 6/1986 | Spangler | 16/121 |
| 4,616,673 | 10/1986 | Bondar | 137/315 |
| 4,739,788 | 4/1988 | Reback | 137/15 |
| 4,794,945 | 1/1989 | Reback | 137/315 |
| 4,815,360 | 3/1989 | Winterle | 403/370 |
| 4,824,281 | 4/1989 | Katsube | 403/370 |
| 4,842,009 | 6/1989 | Reback | 137/315 |

Primary Examiner—George L. Walton
Attorney, Agent, or Firm—Arthur Freilich; Robert D. Hornbaker; Leon D. Rosen

[57] ABSTRACT

A faucet handle assembly is described for replacing a handle on a faucet valve stem, which can mount on a wide variety of types of stems. The assembly includes a pair of jaws (30, 32, FIG. 1) having inner surfaces for engaging opposite sides of the periphery (22) of the valve stem and having outer camming surfaces (42, 43) that can be pushed together. The assembly also includes a faucet handle (12) with a hole in the top for passing a screw (28) that screws into a threaded hole of the valve stem, and having a cavity (44) for receiving the jaws. The cavity has camming surfaces (54, 56) that engage the jaw camming surfaces, so as the screw is tightened the jaws are pressed tightly against the valve stem peripheral surface.

13 Claims, 2 Drawing Sheets

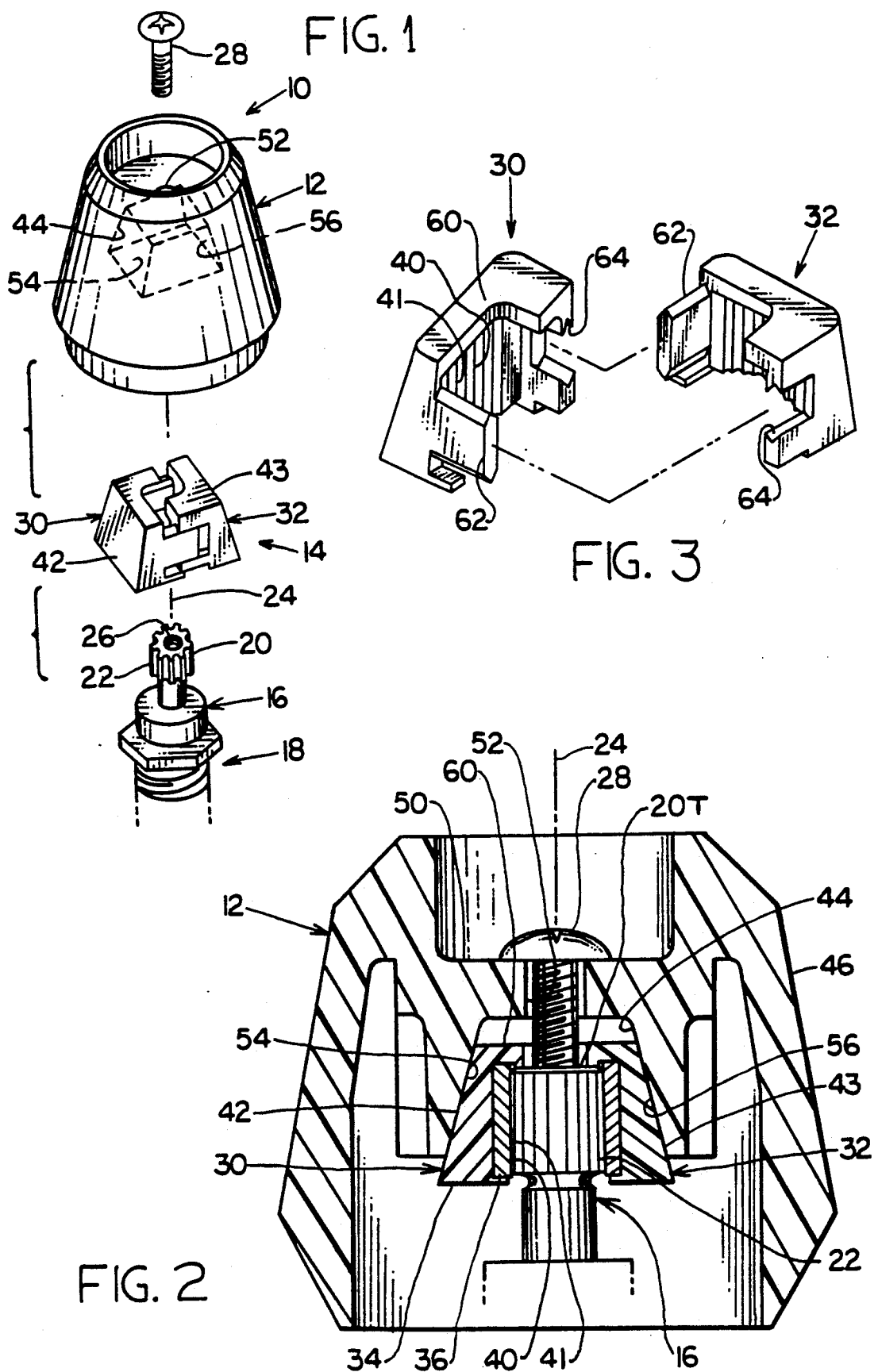

FAUCET HANDLE UNIVERSAL COUPLING

BACKGROUND OF THE INVENTION

Faucets generally include a faucet valve stem which is turned to open and close a valve, and a handle assembly mounted on the valve stem to turn the stem. Almost all home faucet valve stems in the United States have a threaded hole in the top of the stem into which a screw can be turned to hold a faucet handle to the stem. However, a wide variety of stem peripheral surfaces are encountered on the top part of the stem, including those with a square cross section, those with a splined cross section, and those with a circular cross section on one side and a flat surface on the other, with stems of a particular peripheral type occurring in different sizes. It may be noted, however, that most stems have peripheral surfaces to be engaged, which are of uniform cross-sections along the height of the stem top part.

In the past, when a faucet handle had to be replaced, it was often necessary to obtain a particular one of a large number of handle types, which was specifically made for that type of valve stem. This required dealers to stock a large number of faucet handle types, which raised the cost to the buyer. To avoid the need to stock many handle types, a universal coupling has been widely used, with a square or other nonround periphery that fits into a corresponding handle cavity, and with a hole that receives a valve stem. A set screw on the coupling has a pointed end that is tightened against the valve stem. An important disadvantage of such coupling is that the pointed end of the set screw contacts a very limited area of the valve stem, and when there is slippage the pointed end cuts a circular groove in the stem. This not only ruins the connection of the handle to the valve stem, but permanently damages the valve stem.

More recently, universal faucet handle repair kits have been sold, which enable a handle to be attached to a wide variety of valve stems without danger of slippage or damage to the valve stem. The kit includes a handle with a cavity of square cross section and small adapters or spuds whose outside fits the handle cavity, but with each spud having a different hole which fits a different type of valve stem. U.S. Pat. No. 4,739,788 by Reback describes a kit of this type. Each kit requires about 12 different spuds to accommodate valve stems having a wide variety of different peripheral surfaces to be engaged. While each spud is relatively small and inexpensive, the need to manufacture and package a large number of spuds with each kit, of which all but one will be discarded, increases the cost of the kit. Also, the need for the repair man to carefully select that spud which best fits the valve stem, increases the time and effort required to replace a handle. A faucet handle assembly which could be mounted on almost all home faucet valve stems in a reliable connection therewith, without requiring a large number of disposable spuds and without requiring the repair man to determine the precise type of valve stem on which he is working, would be of considerable value.

SUMMARY OF THE INVENTION

In accordance with one embodiment of the present invention, a faucet handle assembly is provided, which can attach to faucet valve stems that have a wide variety of peripheral surfaces that must be engaged to turn the stem. The assembly includes a plurality of jaws having inner surfaces for engaging the valve stem peripheral surface, and having a group of outer camming surfaces. Where the valve stem is of the usual type having a threaded hole in its top, the assembly includes a faucet handle having a top wall for lying over the valve stem. The faucet top wall has a hole which receives a screw that screws into the hole in the top of the valve stem. The handle also has a cavity which receives the jaws. The handle cavity has a group of handle camming surfaces that engage the jaw camming surfaces, with one of the group of camming surfaces being tapered so the surfaces lie progressively closer together at progressively higher locations. Thus, as the screw is tightened, the forces on the tapered surfaces press the inner surfaces of the jaws tightly against the valve stem peripheral surface.

The jaws can be constructed with a top flange which extends inward of the inner surface that grasps the periphery of the valve stem. This holds the jaws from moving vertically along the valve stem as the screw is tightened. The plurality of jaws preferably includes two jaws that are slideably connected to each other and which have inclined camming surfaces, while the walls of the handle cavity preferably also have inclined surfaces that engage the jaw inclined surfaces.

The novel features of the invention are set forth with particularity in the appended claims. The invention will be best understood from the following description when read in conjunction with the accompanying drawings.

BRIEF DESCRIPTION OF THE DRAWINGS

FIG. 1 is an exploded isometric view of a faucet handle assembly of the present invention, and with a valve stem on which it can be mounted.

FIG. 2 is a sectional side view of the assembly of FIG. 1, shown fully mounted on the valve stem.

FIG. 3 is an exploded isometric view of the jaws of FIG. 1, shown spaced apart.

DESCRIPTION OF THE PREFERRED EMBODIMENT

Figure 4:
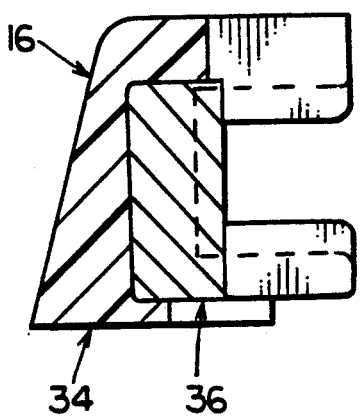
FIG. 4 is a sectional side view of one of the jaws of FIG. 3.
Figure 5:
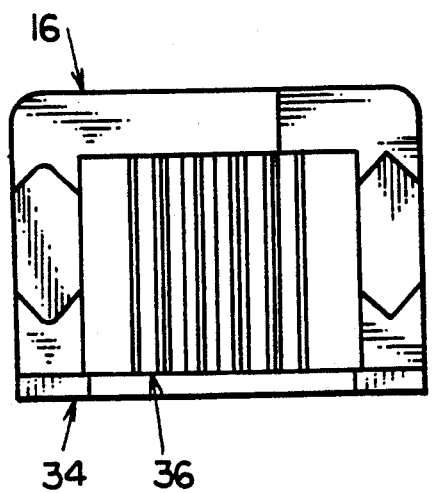
FIG. 5 is a front elevation view of the jaw of FIG. 4.

FIG. 1 illustrates a faucet handle assembly 10 of the present invention, which includes a replacement faucet handle 12 and a universal coupling 14 that can connect the handle to a valve stem 16 of a valve 18. The valve stem has an upper end 20 with a peripheral surface 22 that is designed to be tightly engaged to turn the valve stem about an axis 24 to operate the valve. The valve stem has a threaded hole 26 on the axis 24, in its upper end 20, which is designed to receive a screw 28. Previously, a replacement handle was required which had a cavity that matched the peripheral surface 22 of the valve stem in shape and size, and which was securely held by the screw. A more recently sold replacement kit included one handle and a large number of adapters or spuds that all had an outer surface that could fit the handle cavity, and with different spuds having different hole shapes and sizes to fit different valve stems. The universal coupling 14 of the present invention allows the replacement handle 12 to fit a wide variety of commonly encountered valve stems for small valves of the type used for home water faucets.

The universal coupling 14 includes two jaws 30, 32 which can slide together to grip the peripheral surface 22 of the valve stem between them. As shown in FIG. 2, each jaw such as 30 includes a molded plastic frame 34 and an insert 36 of hard material such as metal which has primarily vertically extending teeth 40 forming the jaw inner surface 41 that can tightly engage the peripheral surface 22 of the valve stem. The vertically extending teeth can engage a few vertically elongated areas or "line" areas of most stems, instead of only "point" areas. Each jaw also has an outer surface, or jaw camming surface 42, 43. When the camming surfaces 42, 43 of the two jaws 30, 32 are pushed together, the insert teeth 40 can tightly grip the stem peripheral surface 22.

The handle 12 has a cavity 44 that receives the jaws 30, 32. The handle has an outside 46 which can be turned by hand about the axis 24. The handle has a top wall 50 with a hole 52 which passes the screw 28 that screws into the valve stem 16.

The downwardly-opening cavity 44 in the handle has opposite side walls 54, 56 which are tapered, or angled from parallelism with each other and the axis 24, so that the opposite side walls lie progressively closer together at progressively higher locations that are closer to the handle top wall. The side walls 54, 56 form pressing or camming surfaces. The jaw camming surfaces 42, 43 are similarly angled from parallelism. When the jaws 30, 32 lie in the tapered handle cavity 44, and the screw 28 is tightened to move the handle downwardly over the jaws, the cavity side walls 54, 56 press the jaw camming surfaces 42, 43 progressively closer together, to cause the jaws to move together to tightly grip the peripheral surface 22 on the valve stem. Once the screw has been tightened so the jaws tightly grip the valve stem, turning of the handle 12 will cause turning of the valve stem to operate the valve. The jaws 30, 32 can grip valve stems having a wide variety of peripheral surfaces, of different shapes and sizes.

Each of the jaws has a top flange 60 which extends inward (toward axis 24) of its inner surface 41 which forms teeth to grip the periphery of the valve stem. The top flange 60 lies on the top 20T of the upper end of the valve stem. This assures that as the handle is moved down by tightening of the screw, the jaws will remain at the upper end of the valve stem and be squeezed together against the valve stem. While applicant prefers to taper both the walls of the cavity and the corresponding outer surfaces of the jaws, or in other words angle them from the stem axis 24, it would be possible to angle only one of the camming surfaces such as only the jaw camming surfaces 42, 43, or only the cavity side wall camming surfaces 54, 56. However, by tapering both of the engaging surfaces, applicant distributes the forces applied to cause the jaws to grip the valve stem.

As shown in FIG. 3, the two jaws 30, 32 are identical. Each jaw has a middle forming the teeth 40, and has opposite sides, with one side forming a tongue 62 and the other side forming a groove 64. The jaws are assembled by inserting the tongues 62 into the grooves 64 to slideably connect the jaws. This allows the jaws to slide horizontally, or perpendicular to the valve stem axis, while preventing one jaw from moving vertically relative to the other. An advantage of this arrangement is that the two jaws can be placed as a unit on top of the valve stem, and will not fall off before the handle is lowered around the jaws. Of course, in the tongue and groove arrangement, it is possible to have a groove in the form of a hole instead of one with top and bottom groove portions and with open sides. Each jaw is formed by molding plastic around the metal insert to anchor the insert 40 in the plastic molded frame 34.

Figure 6:
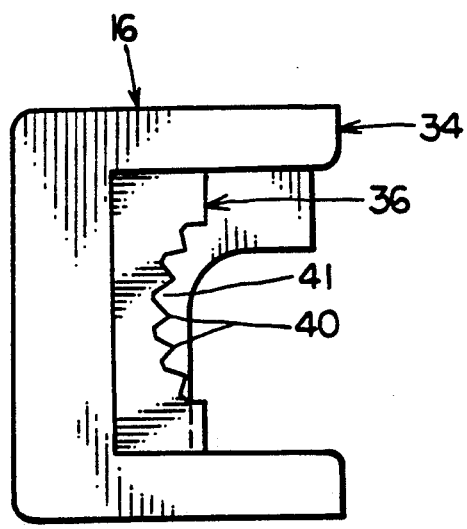
FIG. 6 is a bottom view of the jaws of FIG. 3.
Figure 7:
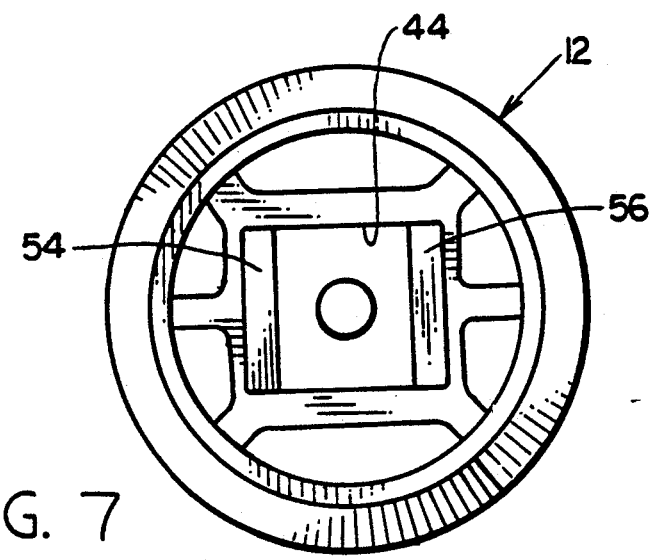
FIG. 7 is a bottom view of the handle of the assembly of FIG. 1.

As shown in FIG. 7, the handle cavity includes a pair of parallel walls 70, 72 which help located the handle on the jaws, although these walls 70, 72 are not necessary. As shown in FIG. 6, each jaw such as 16 has a cutout 74 in the top flange 60, for passing the screw. A few screws may be supplied with each replacement assembly, so one of the screws will fit the threaded hole of the particular valve stem on which the handle assembly will be installed.

Applicant prefers to use the handle cavity walls to move the jaws together to tightly grip the valve stem. However, it is possible to use a pair of screws or other device that moves the jaws together against the stem before the handle is installed, and to use the handle cavity walls only to turn the jaws.

Thus, the invention provides a faucet handle assembly which can attach to faucet valve stems having a wide variety of peripheral surfaces. The assembly includes a plurality of jaws such as two of them having inner surfaces for engaging opposite sides of a valve stem peripheral surface, and having jaw camming surfaces for moving the jaws together. The jaws have a guide, such as a tongue and groove slideable connection, that allows the jaws to move together perpendicular to the axis of the stem while preventing vertical movement of one jaw relative to the other. Each jaw also has a top flange resting on the valve stem. The assembly also includes a faucet handle with a cavity that closely receives the jaws to turn them and the stem after final assembly. The camming walls of the cavity and/or the outside camming surfaces of the jaws are tapered, or angled from parallelism and from the axis of the valve stem, so that as the handle is moved down over the jaws it pushes the jaws together to tightly grip the valve stem. Of course, while the terms "top", "vertical", "horizontal", and the like are used herein to aid in understanding the invention, it should be understood that the valve stems and the handle assemblies can be used in any orientation with respect to the earth's gravity.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A faucet handle assembly for attachment to a faucet valve stem that has an upper end with a threaded hole and a peripheral surface which must be turned about an axis to operate the faucet valve, comprising:
   a plurality of jaws having inner surfaces for engaging said valve stem peripheral surface, said jaws being movable together and apart from one another;
   a screw having a head and a threaded shank;
   a faucet handle for lying over said valve stem, said handle having a hole for passing the shank portion of said screw that threads into the stem hole while allowing the head of said screw to press down the handle;
   said handle having pressing surfaces for receiving said jaws to press against jaw surfaces that lie outside of said jaw inner surfaces so as to press said jaws together to move said jaw inner surfaces against said stem periphery when said screw is tightened downwardly against said handle, to thereby couple said handle to said valve stem.

2. The assembly described in claim 1 wherein:
said jaws have a group of camming surfaces forming said jaw surfaces that lie outside of said jaw inner surfaces;
said handle has a top wall forming said hole for passing said screw, said handle having a downwardly-opening cavity for receiving said jaws;
said cavity having a group of handle camming surfaces, forming said pressing surfaces, for engaging said group of jaw camming surfaces, with one of said groups of camming surfaces being tapered to lie progressively closer together at progressively higher locations and forming said means for pressing, so as said screw si tightened said jaw camming surfaces are pressed together to press said jaw inner surfaces tightly against said valve stem peripheral surface.

3. The assembly described in claim 1 wherein:
said jaws each have a top flange which extends inward of its inner surface to lie on top of said upper end of said valve stem.

4. The assembly described in claim 1 wherein:
said group of jaws includes two jaws that are slideably engaged to allow them to move horizontally together and apart while preventing their relative vertical movement, whereby to facilitate installation of the jaws.

5. The assembly described in claim 1 where:
said inner surfaces of said jaws form vertically-extending teeth.

6. The assembly described in claim 1 wherein:
said group of jaws includes two identical jaws that are slideably engaged with each other, each jaw having a middle with teeth for engaging one side of said stem peripheral surface, and each jaw having opposite jaw sides on opposite sides of said middle;
one of said jaw sides of each jaw forming a tongue projecting toward the other jaw and with the other jaw side of each jaw forming a groove that slideably receives a tongue of the other jaw.

7. The assembly described in claim 6 wherein:
each jaw includes a plastic molded body forming the tongue and groove and a portion of said middle, and a metal insert forming said teeth.

8. A faucet handle replacement assembly for replacing a faucet handle on a faucet valve stem, wherein the stem is of a type that has an upper end with a threaded hole for receiving the threaded shank of a screw while the head of the screw holds down the handle, and wherein the stem has a peripheral surface which must be turned to operate the faucet valve, comprising:
a replacement faucet handle having a top wall for lying over said valve stem, said top wall having a hole for receiving the shank of said screw that screws into said stem threaded hole while the head of the screw presses down the handle top wall, said handle having a downwardly-opening cavity with sloping side walls that lie progressively closer at progressively higher locations therealong;
a plurality of jaws that are movable together and apart from one another, said jaws having upper flanges that can lie on said stem upper end, and said jaws having outer surfaces that are inclined from the vertical and which engage said sloping side walls, so as said handle moves down said sloping side walls of said handle cavity push against said jaw outer surfaces to push said jaws tightly around said stem.

9. The assembly described in claim 8 wherein:
said plurality of jaws includes two jaws that are slideably connected to move only horizontally together and apart, so they stay together as a unit when placed about said valve stem before said handle is placed around said jaws.

10. A faucet handle assembly for attachment to a faucet valve stem that has a peripheral surface which must be turned to turn the valve stem about an axis to operate the valve, comprising:
a pair of jaws having inner surfaces for engaging opposite sides of said valve stem peripheral surface and having jaw camming surfaces that can be pressed to move said jaws toward each other to grip said valve stem surface;
a handle device that includes a handle, which fits over said jaws to turn them and said valve stem about said axis, and that engages said jaw camming surfaces to force said jaws toward each other to grip said valve stem;
said jaws having guides that are engaged with each other that allow said jaws to move toward and away from each other along directions perpendicular to said axis, while preventing movement of one of said jaws parallel to said axis relative to the other jaw.

11. The assembly described in claim 10 in which said valve stem has a top with a threaded hole, wherein:
said handle has a top wall with a screw-receiving hole for passing a screw that can engage the threaded hole in the top of said valve stem;
each of said jaws has a top flange that extends inward of its inner surface to lie on said valve stem top, whereby to support the jaws until they tightly grip the valve stem periphery.

12. The assembly described in claim 11 wherein:
said handle has a cavity which receives said jaws, said cavity having a pair of opposite walls that are angle from parallelism so progressively higher wall locations are progressively closer together;
said jaws being constructed so they fit in said handle cavity with said jaw camming surfaces engaging said pair of opposite walls of said cavity, to press said jaws together as they move up said cavity when said screw is tightened.

13. The assembly described in claim 10 wherein:
said pair of jaws form a pair of tongues and grooves with each tongue on one jaw being slideably engaged with a groove on the other jaw, to form said guide that allows said jaws to slide together and apart.

* * * * *